United States Patent [19]

Wilson

[11] Patent Number: 4,587,814
[45] Date of Patent: May 13, 1986

[54] MECHANICAL SECURITY DEVICE

[75] Inventor: Dennis W. Wilson, Sumner, Wash.

[73] Assignee: Designs Unlimited, Inc., Federal Way, Wash.

[21] Appl. No.: 618,721

[22] Filed: Jun. 8, 1984

[51] Int. Cl.$^4$ ............................................. F16B 41/00
[52] U.S. Cl. ........................................ 70/232; 70/164
[58] Field of Search ................. 70/232, 229, 230, 163, 70/164, 174, 175, 176, 177, 178, 179, 180

[56] References Cited

U.S. PATENT DOCUMENTS

| | | | |
|---|---|---|---|
| 619,735 | 2/1899 | Schreiner | 70/232 |
| 716,204 | 12/1902 | De Waldo | 70/232 |
| 725,290 | 4/1903 | Speer . | |
| 968,759 | 8/1910 | Fogg . | |
| 2,048,424 | 7/1936 | Caldwell | 70/232 |
| 3,678,717 | 7/1972 | Eaton | 70/232 |
| 3,930,389 | 1/1976 | Buikus . | |
| 4,003,228 | 1/1977 | Lievens et al. | 70/232 |
| 4,407,146 | 10/1983 | Nielsen, Jr. | 70/232 |

Primary Examiner—Robert L. Wolfe
Attorney, Agent, or Firm—Christensen, O'Connor, Johnson & Kindness

[57] ABSTRACT

A mechanical security device for preventing disconnection between first and second objects. The first and second objects include a nut rotatable with respect to the objects in one direction to connect the objects and in an opposite direction to disconnect the objects. In one embodiment, the security device comprises a guard collar and a locking bar. The guard collar is adapted for positioning around the nut to prevent it from being accessed for rotation. The locking bar is adapted to prevent substantial rotation of the guard collar with respect to the first object, and to limit axial movement of the guard collar to a degree sufficient to prevent the nut from being accessed for rotation. The security device is particularly suited for preventing removal of a regulator from a compressed gas cylinder.

5 Claims, 6 Drawing Figures

MECHANICAL SECURITY DEVICE

FIELD OF THE INVENTION

The present invention relates to mechanical security devices and, in particular, to security devices for preventing objects from being disconnected from one another.

BACKGROUND OF THE INVENTION

The use of compressed gas frequently requires a regulator connected between the gas cylinder and the point of end use of the gas. For example in oxyacetylene welding, a regulator is used between each gas cylinder and the welding torch. The regulators can be adjusted to control the pressure and the rate of flow of gas to the torch. Connection of a regulator to a gas cylinder is usually accomplished through an inlet conduit that extends from the regulator housing and that has an internally threaded nut journaled on its end. The regulator inlet conduit is shaped to mate with an externally threaded conduit extending from the valve housing on top of the gas cylinder. Threaded engagement between the internally threaded nut and the valve housing conduit secures the connection and makes it air tight.

Regulators are comparatively small and expensive, and are therefore subject to theft. Removal of a regulator from a gas cylinder simply involves unscrewing a single nut. There is therefore a need for an effective device for locking or otherwise securing regulators to cylinders. Prior security devices, however, are in varying degrees unsuitable for this purpose.

One class of prior security devices, adapted primarily for securing the union between two gas lines, comprises a pair of casing sections that can be joined together around the union and locked to one another. One limitation of such devices is that they are secured against axial movement only by interference between the closed casing sections and the union nut, and different security devices must therefore be used for different sizes of gas line. A further limitation of such devices is that someone attempting unauthorized disconnection can often crimp the device such that the casing simply becomes an extension of the nut, permitting rotation of the nut through the casing and disconnection of the pipes.

SUMMARY OF THE INVENTION

The present invention overcomes the limitations of prior devices by providing a security device that includes means for preventing access to a nut or other connecting member, together with means for preventing either rotation or axial movement of the device.

In one preferred embodiment, the security device of the present invention is adapted for preventing disconnection of first and second objects. The first and second objects include a connecting member that is rotatable in one direction about an axis to disconnect the objects and in an opposite direction about the axis to connect the objects. The security device comprises guard means adapted to be positioned around the connecting member, and locking means for preventing or limiting movement of the guard means. The guard means is adapted such that when it is positioned around the connecting member, it prevents the connecting member from being accessed for rotation thereof. The locking means prevents substantial rotational movement of the guard means, and also limits axial movement of the guard means to a degree sufficient to prevent the connecting member from being accessed.

In another aspect of the invention, the guard means includes means for selectively engaging the connecting member, such that when the guard means is not prevented from rotating by the locking means, the connecting member can be rotated by rotating the guard means.

These and other features of the invention will become apparent in the detailed description and claims to follow, taken in conjunction with the accompanying drawings.

DETAILED DESCRIPTION OF THE INVENTION

Figure 1:
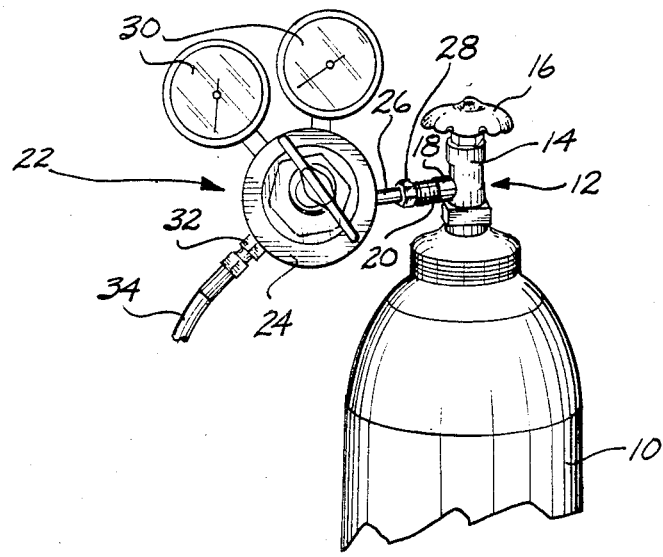
FIG. 1 is a perspective drawing of a gas cylinder with a regulator attached.

FIG. 1 illustrates a conventional compressed gas apparatus comprising gas cylinder 10 and regulator 22. The connection between cylinder 10 and regulator 22 is provided by valve 12 mounted to the top of the cylinder. Valve 12 comprises housing 14, handle 16, and a laterally extending conduit 18 that includes threads 20 on its outer surface.

Regulator 22 includes body 24, inlet conduit 26 and gauges 30. Inlet conduit 26 includes connecting nut 28 journaled on the end of the inlet conduit. Inlet conduit 26 and conduit 18 of valve 12 include respective fittings adapted to be mated together to form an air tight passage between the cylinder and the regulator. The connection between the fittings is secured by threading connecting nut 28 onto threads 18 so as to tighten the connection between the conduits. Regulator 22 also comprises outlet fitting 32 to which a tube 34 may be attached to convey the gas to a welding torch or other point of use.

To disconnect regulator 22 from valve 12, connecting nut 28 is rotated such that the nut moves away from valve 12 and disengages from conduit 18. It is therefore apparent that absent the security device of the present invention, theft of regulator 22 merely requires a wrench, pliers, or other tool for loosening connecting nut 28.

Figure 2:
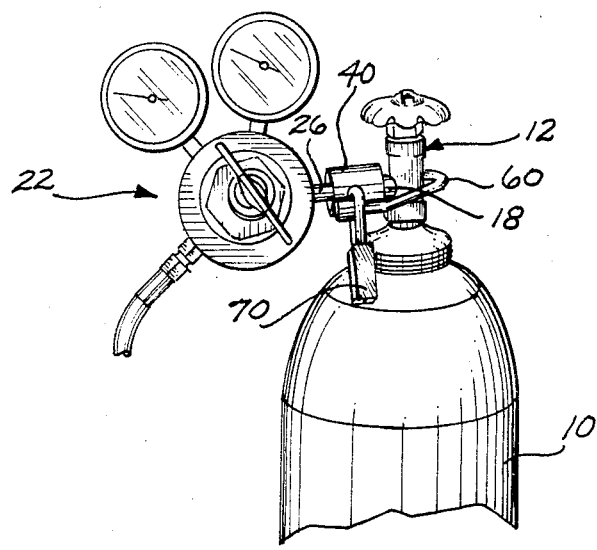
FIG. 2 is a perspective drawing of the cylinder and regulator of FIG. 1, with the regulator locked to the cylinder by means of the security device of the present invention.
Figure 3:
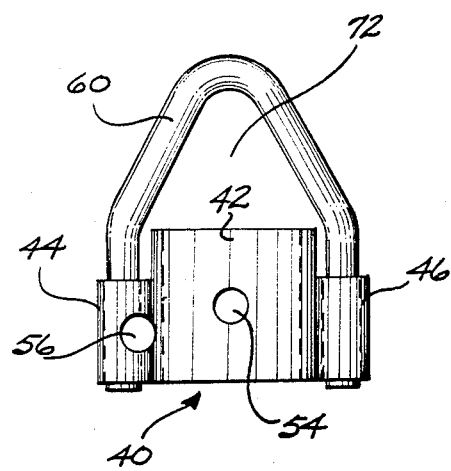
FIG. 3 is a top plan view of one embodiment of the security device of the present invention.
Figure 4:
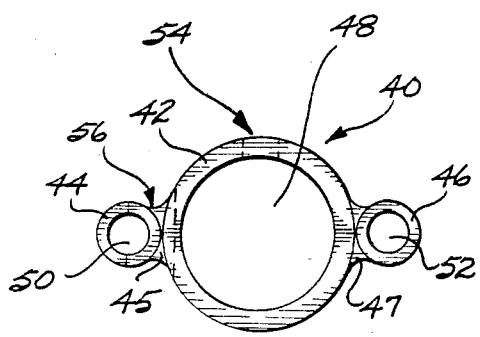
FIG. 4 is a side elevational view of the guard member of the security device of FIG. 3.
Figure 6:
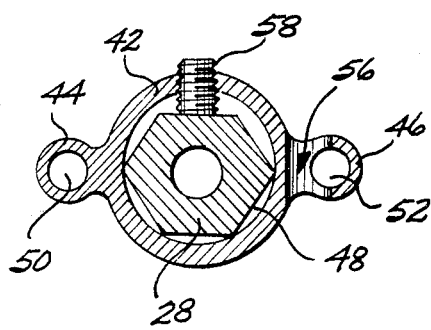
FIG. 6 is a side elevational view of the guard member of FIG. 4 positioned around a connecting nut.
Figure 5:
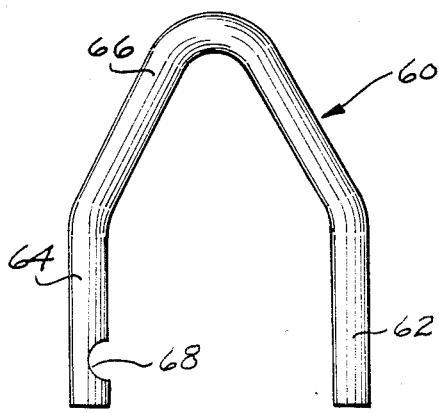
FIG. 5 is a plan view of the locking bar of the security device of FIG. 3.

One embodiment of the security device of the present invention is illustrated in FIGS. 2-6. Referring initially to FIGS. 3-5, the security device comprises guard member 40 and locking bar 60. Guard member 40 comprises a comparatively large, central guard collar 42 flanked by a pair of smaller mounting tubes 44 and 46. Guard collar 42 consists of a cylindrical shell whose inner surface defines passage 48. The diameter of passage 48 is large enough to permit the guard collar to be positioned over an object to be guarded, such as connecting nut 28 of FIG. 1. Mounting tubes 44 and 46 consist of cylindrical shells whose inner surfaces define passages 50 and 52 respectively. Mounting tubes 44 and 46 are attached to opposite sides of guard collar 42 by respective webs 45 and 47. The longitudinal axes of mounting tubes 44 and 46 are parallel to the longitudinal axis of guard collar 42. Guard collar 42 also includes opening 54 positioned midway along the length of the guard collar and midway in a circumferential direction between mounting tubes 44 and 46. The purpose of opening 54 is discussed below in connection with FIG. 6. Mounting tube 44 and web 45 include opening 56 that extends through the mounting tube and web in transverse and partially overlapping relationship to passage 50, as indicated in FIGS. 3 and 4.

Locking bar 60 includes spaced apart parallel sections 62 and 64 joined by V-shaped section 66. Parallel section 64 includes notch 68. Locking bar 60 is dimensioned such that parallel sections 62 and 64 can be slidably inserted into passages 50 and 52 of mounting tubes 44 and 46 respectively, as indicated in FIG. 3. When locking bar 60 is so inserted, notch 68 may be aligned with the portion of opening 56 that overlaps passage 50.

FIG. 2 illustrates the use of the security device of the present invention to prevent unauthorized removal of regulator 22 from valve 12 of air cylinder 10. To employ the security device of the present invention, guard member 40 is positioned over inlet conduit 26 of regulator 22 such that the inlet conduit extends into passage 48 of guard collar 42, and the inlet conduit is secured to conduit 18 by means of connecting nut 28. Guard member 40 is then moved axially towards valve 12, into a position in which guard collar 42 surrounds and prevents access to connecting nut 28. Locking bar 60 is then positioned such that parallel sections 62 and 64 are on opposite sides of valve 12, and such that V-shaped section 66 is on the opposite side of valve 12 from guard member 40. Parallel sections 62 and 64 of the locking bar are then inserted into passages 50 and 52 of mounting tubes 44 and 46 respectively. When notch 68 is aligned with opening 56 (see FIG. 3), padlock 70 or an equivalent device is inserted through opening 56 and notch 68 to fix the relative position of the locking bar with respect to the guard member. The security device is dimensioned such that the resulting triangular shaped opening 72 (FIG. 3) is just large enough to accomodate housing 14 of valve 12. The security device can therefore not be moved axially towards or away from regulator 22, and guard member 40 therefore cannot be moved axially to permit access to connecting nut 28. Furthermore, locking bar 60 prevents rotation of guard member 40 with respect to valve 12. Therefore, even if guard collar 42 were to be crimped or collapsed such that it engaged connecting nut 28, the locking bar would prevent rotation of the guard collar and nut, and therefore prevent removal of the regulator.

For some regulators, the length of inlet conduit 26 may be such that connecting nut 28 cannot be accessed when guard member 40 is positioned between the connected regulator and valve, even with locking bar 60 disengaged. To accommodate such regulators, opening 54 of guard collar 42 is provided with internal threads, and the security device includes screw 58 (FIG. 6) adapted to be threaded into opening 54. When guard collar 42 is positioned over connecting nut 28, screw 58 can be tightened such that the rotational position of guard member 40 is fixed with respect to the connecting nut. Thus by rotation of the guard member, connecting nut 28 can be tightened or loosened. After connecting nut 28 is tightened, screw 58 is fully or partially withdrawn, permitting guard member 40 to be rotated to a degree sufficient for insertion of locking bar 60 into passages 50 and 52.

While the preferred embodiments of the invention have been illustrated and described, it should be understood that variations will be apparent to those skilled in the art. Accordingly, the invention is not to be limited to the specific embodiments illustrated and described, and the true scope and spirit of the invention are to be determined by reference to the following claims.

The embodiments of the invention in which an exclusive property or privilege is claimed are defined as follows:

1. A security device for preventing the disconnection of first and second objects from one another, the first and second objects comprising connecting means including a connecting member rotatable with respect to the first and second objects in one direction about an axis to connect the objects and in an opposite direction about the axis to disconnect the objects, the security device comprising:

guard means adapted to be positioned around the connecting member so as to prevent the connecting member from being accessed for rotation thereof, the guard means comprising an integral, one-piece guard member shaped to fully encircle the connecting member; and, locking means adapted for preventing substantial rotational movement of the guard means with respect to the first object and for limiting axial movement of the guard means to a degree sufficient to prevent the connecting member from being accessed for rotation thereof.

2. The security device of claim 1, wherein the locking means comprises a locking member that may be selectively secured to the guard means, the locking member being shaped such that when the locking member is secured to the guard means and the guard means is positioned around the connecting member, the locking member prevents substantial rotational movement of the guard means with respect to the first object, and limits axial movement of the guard means to a degree sufficient to prevent the connecting member from being accessed for rotation thereof.

3. A security device for preventing the disconnection of first and second objects from one another, the first and second objects comprising connecting means including a connecting member rotatable with respect to the first and second objects in one direction about an axis to connect the objects and in an opposite direction about the axis to disconnect the objects, the security device comprising:

guard means adapted to be positioned around the connecting member so as to prevent the connecting member from being accessed for rotation thereof; and locking means adapted for preventing substantial rotational movement of the guard means with respect to the first object and for limiting axial movement of the guard means to a degree sufficient to prevent the connecting member from being accessed for rotation thereof;

the guard means including means for selectively engaging the connecting member, such that when the guard means is not prevented from rotating by the locking means, the connecting member can be rotated by rotating the guard means.

4. A security device for preventing the disconnection of first and second objects from one another, the first and second objects comprising connecting means including a connecting member rotatable with respect to the first and second objects in one direction about an axis to connect the objects and in an opposite direction about the axis to disconnect the objects, the security device comprising:

guard means adapted to be positioned around the connecting member so as to prevent the connecting member from being accessed for rotation thereof, the guard means comprising a guard member shaped to encircle the connecting member and two mounting members fastened to opposite sides of the guard member, the mounting members being shaped so as to define a pair of passages; and locking means adapted for preventing substantial rotational movement of the guard means with respect to the first object and for limiting axial movement of the guard means to a degree sufficient to prevent the connecting member from being accessed for rotation thereof, the locking means comprising a locking bar having parallel first and second end sections interconnected by an intermediate section, the first and second end sections being adapted for insertion in the passages, one end section of the locking bar including a notch, the guard means including an opening transverse to and partially overlapping with one of the passages, whereby the notch may be aligned with the opening when the first and second ends of the locking bar are received in the respective passages to thereby allow insertion of a locking device through the aligned notch and opening.

5. The security device of claim 3, wherein the guard means comprises a guard member shaped to encircle the connecting member, the guard member including an internally threaded opening having an insert threadably mounted therein, such that when the guard member is positioned to encircle the connecting member, the insert can be moved into engagement with the connecting member, whereby when the guard member is not prevented from rotating by the locking means, the connecting member can be rotated by moving the insert into engagement with the connecting member and rotating the guard member.

* * * * *